(12) United States Patent
Wu et al.

(10) Patent No.: US 11,057,788 B2
(45) Date of Patent: Jul. 6, 2021

(54) METHOD AND SYSTEM FOR ABNORMAL VALUE DETECTION IN LTE NETWORK

(71) Applicant: NANJING HOWSO TECHNOLOGY CO., LTD, Jiangsu (CN)

(72) Inventors: Donghua Wu, Jiangsu (CN); Alexis Huet, Vitry-aux-Loges (FR); Lulu Shi, Jiangsu (CN)

(73) Assignee: NANJING HOWSO TECHNOLOGY CO., LTD, Jiangsu (CN)

( * ) Notice: Subject to any disclaimer, the term of this patent is extended or adjusted under 35 U.S.C. 154(b) by 210 days.

(21) Appl. No.: 16/307,993

(22) PCT Filed: Feb. 6, 2017

(86) PCT No.: PCT/CN2017/073005
§ 371 (c)(1),
(2) Date: Dec. 7, 2018

(87) PCT Pub. No.: WO2018/076571
PCT Pub. Date: May 3, 2018

(65) Prior Publication Data
US 2019/0261204 A1  Aug. 22, 2019

(30) Foreign Application Priority Data
Oct. 28, 2016 (CN) .......................... 201610970187.7

(51) Int. Cl.
*H04W 24/08* (2009.01)
*G06N 20/00* (2019.01)
(Continued)

(52) U.S. Cl.
CPC ............ *H04W 24/08* (2013.01); *G06N 20/00* (2019.01); *H04L 41/147* (2013.01); *H04L 43/16* (2013.01); *H04W 24/04* (2013.01); *H04W 24/06* (2013.01)

(58) Field of Classification Search
CPC ..... H04W 24/08; H04W 24/04; H04W 24/06; G06N 20/00; G06N 7/005; H04L 41/147;
(Continued)

(56) References Cited

U.S. PATENT DOCUMENTS 7,587,374 B1 * 9/2009 Lynch .................... G06N 7/005
706/16
2003/0140039 A1 * 7/2003 Ferguson ........... G06K 9/00503
(Continued)

FOREIGN PATENT DOCUMENTS

CN 101561878 A 10/2009
CN 102542295 A 7/2012
(Continued)

OTHER PUBLICATIONS

CN Office Action for Application No. 201610970187.7; dated Aug. 2, 2017.
(Continued)

*Primary Examiner* — Dady Chery
(74) *Attorney, Agent, or Firm* — Cantor Colburn LLP (57) ABSTRACT

A method and system for detecting abnormal values in an LTE network is provided: dividing measured data into a training and a testing set; defining clusters and parameters in the training set, and finding the cluster to which each point belongs using clustering algorithms; calculating a likelihood of each point based on parameters and clustering results; assigning the likelihood into an abnormal, an intermediate or a normal region according to a set warning and alarming threshold; and applying a calculated model to the testing set, the likelihood of each point is calculated and assigned to a region, thereby finding abnormal values in the testing set. The variation of data points versus time may be better understood by introducing time axes into the model, thereby multiple abnormal values may be discovered from a
(Continued)

sequence of multiple points. The method can immediately detect abnormal values and the error rate is low.

8 Claims, 7 Drawing Sheets

(51) Int. Cl.
*H04L 12/24* (2006.01)
*H04L 12/26* (2006.01)
*H04W 24/04* (2009.01)
*H04W 24/06* (2009.01)

(58) Field of Classification Search
CPC ....... H04L 43/16; H04L 41/145; H04L 43/50; H04L 41/0681
See application file for complete search history.

(56) References Cited

U.S. PATENT DOCUMENTS

| | | | | |
|---|---|---|---|---|
| 2004/0019466 A1* | 1/2004 | Minor | .................... | G16B 25/00 702/190 |
| 2014/0046878 A1* | 2/2014 | Lecomte | ................. | G10L 25/51 706/12 |
| 2018/0164428 A1* | 6/2018 | Won | ........................ | G01S 13/90 |

FOREIGN PATENT DOCUMENTS

| | | |
|---|---|---|
| CN | 102664961 A | 9/2012 |
| CN | 104601565 A | 5/2015 |
| CN | 104618175 A | 5/2015 |
| CN | 104935600 A | 9/2015 |
| CN | 104951786 A | 9/2015 |
| CN | 105227907 A | 1/2016 |

OTHER PUBLICATIONS

CN Office Action for Application No. 201610970187.7; dated Feb. 8, 2018.
CN Office Action for Application No. 201610970187.7; dated Nov. 16, 2017.
CN Search Report for Application No. 201610970187.7.
English Machine Translation to Abstract CN101561878.
English Machine Translation to Abstract CN104601565.
English Machine Translation to Abstract CN104935600.
English Machine Translation to Abstract CN105227907.
"Word Clustering Using PLSA Enhanced with Long Distance Bigrams" Bassiou, Nikoletta; 2010 20th International Conference on Pattern Recognition, Aug. 26, 2010.
English Machine Translation of CN102542295 Abstract.
English Machine Translation of CN102664961 Abstract.
English Machine Translation of CN104618175 Abstract.
English Machine Translation of CN104951786 Abstract.
International Search Report for Application No. PCT/CN2017/073005.

* cited by examiner

METHOD AND SYSTEM FOR ABNORMAL VALUE DETECTION IN LTE NETWORK

CROSS REFERENCE TO RELATED APPLICATIONS

This application is a National Stage of PCT Application No. PCT/CN2017/073005 filed on Feb. 6, 2017, which claims priority to Chinese Patent Application No. 2016 10970187.7 filed on Oct. 28, 2016, the contents each of which are incorporated herein by reference thereto.

TECHNICAL FIELD

The present disclosure relates to a method and a system for abnormal value detection in an LTE network.

BACKGROUND

In the past few years, data generated over telecommunication networks has grown exponentially. Abnormal value detection makes finding abnormalities in unanticipated data patterns through manual mode become difficult. Due to a huge amount of data, even professional experts cannot find out abnormal values by looking through log files.

Rapid development of LTE networks has resulted in more and more network traffic data. Therefore, processing and analysing those traffic data manually is unlikely. In particular, detecting abnormal values automatically from a continuous data flow remains a challenge to be realized. This technical field is critical because anomalies may lead to poor network efficiency. The origin of these anomalies may be technical faults in a cell or fraudulent intrusions during using a network, which need to be confirmed and fixed as soon as possible.

A good abnormal value detection procedure must have the following three aspects: first, it can effectively detect a real abnormal value, even an abnormal value in a new mode which is difficult to predict manually; second, the processing speed of the procedure must be fast, and the procedure can reduce the time length from appearance of an abnormal value to correction of the abnormal value; finally, the error rate must be low. The aspect of time is usually not considered in conventional abnormal value detection algorithms. Therefore, these conventional algorithms are difficult to detect some anomalies accurately.

Conventional method for detecting an abnormal value uses a supervised algorithm. In this case, the supervised algorithm is to train in a data set including abnormal values and try to separate the abnormal values from those normal values. There are some major drawbacks to this type of algorithms. In most cases, anomalies are rare and diverse. Some of the anomalies that have been identified may be different from the new anomalies that follow. Therefore, this type of supervised algorithms is not appropriate for an unanticipated type of abnormal values.

An unsupervised algorithm is described below. Unlike the supervised algorithm, the unsupervised algorithm uses non-labeled data, which means that the training data set does not contain information about whether each datum in it is an abnormal value or not. Therefore, the unsupervised algorithm can automatically distinguish abnormal values in different data structures and modes. The algorithm does not find out the abnormal values directly, but describes and groups the data. Then get the abnormal values from these groups. The main advantage of this method is the ability to detect previously unforeseeable or unanticipated anomalies.

The main statistical technique for unsupervised learning is clustering. The purpose of clustering is to separate data points and group data points with similar characteristics together. Each group is called a class. Each group is called a cluster (bunch). The similarity among objects can be defined analytically. There are many different clustering algorithms in the industry, and the difference between them is the criteria for evaluating similarity among objects, which may be evaluated by distances, densities, or statistical distributions.

Therefore, there is a need to develop a method for finding out abnormal values based on a data driven system and making full use of machine learning algorithms.

SUMMARY

One of aims of the present disclosure is to provide a method and a system for detecting an abnormal value in an LTE network, which takes a time axis as an important factor, thereby can detect an abnormal value in a new mode and find an abnormal value under an unanticipated condition quickly and accurately. The method and the system can solve the problems in the prior art such as an abnormal value under an unanticipated condition cannot be detected, or it is unable to discover a plurality of abnormal values from a sequence of a plurality of points.

The technical solution of the present disclosure is:

A method for detecting an abnormal value in an LTE network, comprising steps of:

S1. loading measured data, wherein the measured data is generated based on a pre-selected criterion and has corresponding time, all the data are divided into a training set and a testing set, and the testing set and the training set are independent of each other but contain an identical variable;

S2. defining clusters and parameters in the training set, and finding a cluster to which each datum point belongs based on a clustering algorithm;

S3. calculating a likelihood value of each datum point based on values of parameters and results of clustering, wherein the likelihood value of a datum point is a probability density thereof in a derived model;

S4. assigning the likelihood value into an abnormal region, an intermediate region, or a normal region according to a set warning threshold and a set alarming threshold;

S5. applying a calculated model to the testing set, where the likelihood value of each datum point is calculated, and assigning these datum points into three regions so as to find an abnormal value in the testing set, wherein the three regions include the abnormal region, the intermediate region, and the normal region.

Further in step S2, the clustering algorithm uses a latent semantic analysis model based on Gaussian probability, that is, a GPLSA algorithm, and known a set of observation values W and a set of time axes D, each point in the set of observation values W has a corresponding point in the set of time axes D; the GPLSA algorithm approximates unknown parameters $m_k$, $\Sigma_k$ and $\alpha_{k,s}$ for each cluster k and value s corresponding to each time level, wherein $m_k$ denotes a mean value corresponding to the k-th cluster, $\Sigma_k$ denotes a covariance matrix corresponding to the k-th cluster, $\alpha_{k,s}$ denotes a probability corresponding to time when level is s and cluster is k; and then likelihood estimations of unknown parameters $m_k$, $\Sigma_k$ and $\alpha_{k,s}$ and the most likely cluster for each point are obtained.

The GPLSA algorithm specifically further comprises steps of:

S21. initializing parameters $m_k^{(t-1)}$, $\Sigma_k^{(t-1)}$ and $\alpha_{k,s}$ for all k and s, wherein t denotes times of iterations, when t=1, $m_k^{(t-1)}$ denotes an initial value of the mean value of the k-th cluster, $\Sigma_k^{(t-1)}$ denotes an initial covariance matrix of the k-th cluster, and $\alpha_{k,s}$ denotes a probability corresponding to time when level is s and cluster is k;

S22. calculating, for all k and i and when $W_i=w_i$ and $D_i=d_i$, a probability and the parameter $T_{k,i}^{(t)}$ corresponding to the group of the observation value $Z_i$ being k, i.e., $Z_i=k$, wherein $w_i$ and $d_i$ denotes an observation value and a time value at the i-th datum point respectively, $$T_{k,i}^{(t)} := f\left(w_i \mid m_k^{(t-1)}, \sum_k^{(t-1)}\right)\alpha_{k,d_i}^{(t-1)} \Big/ \sum_{l=1}^{K} f\left(w_i \mid m_l^{(t-1)}, \sum_1^{(t-1)}\right)\alpha_{l,d_i}^{(t-1)} \quad \text{formula (4)}$$

wherein i is a record count of data, t denotes the t-th time of iteration, $T_{k,i}^{(t)}$ denotes a probability of the i-th observation value belonging to the k-th cluster in the t-th time of iteration; f denotes a probability of the observation value is $w_i$ in the k-th cluster when the mean value is $m_k^{(t-1)}$, the covariance matrix is $\Sigma_k^{(t-1)}$ and the (t−1)-th time of iteration is performed; $\alpha_{k,d_i}^{(t-1)}$ denotes a probability of performing the (t−1)-th time of iteration for the k-th cluster when the time value is $d_i$; $m_k^{(t-1)}$ denotes the initial value of the mean value for the k-th cluster and the (t−1)-th time of iteration; and $\Sigma_k^{(t-1)}$ denotes an initial value of the variance for the k-th cluster and the (t−1)-th time of iteration;

S23. calculating $S_{k,s}^{(t)}$ for all k and s, $$S_{k,s}^{(t)} = \sum_{j=1}^{\#E_s} T_{k,E_s(i)}^{(t)} \quad \text{formula (5)}$$

wherein $\#E_s$ denotes a length of set $E_s$, $S_{k,s}^{(t)}$ denotes a mathematical expectation of probability value $T_{k,i}^{(t)}$; $T_{k,E_s(j)}^{(t)}$ denotes a probability of all observation values $E_s(j)$ with index j belonging to cluster k in the j-th time of iteration; and denotes a set of observation values with index j;

S24. updating probability $\alpha_{k,s}$ for all k and s, $$\alpha_{k,s}^{(t)} = \frac{S_{k,a}^{(t)}}{\sum_{l=1}^{K} S_{l,s}^{(t)}} \quad \text{formula (6)}$$

wherein $S_{k,s}^{(t)}$ denotes a mathematical expectation of probability value $T_{k,i}^{(t)}$; and $S_{l,s}^{(t)}$ denotes a mathematical expectation when probability value $T_{k,i}^{(t)}$ belonging to cluster l;

S25. updating the mean value $m_k^{(t)}$ for all k, $$m_k^{(t)} = \frac{\sum_{i=1}^{N} w_i T_{k,i}^{(t)}}{\sum_{i=1}^{N} T_{k,i}^{(t)}} \quad \text{formula (7)}$$

wherein $w_i$ denotes the observation value of the i-th datum; and $T_{k,i}^{(t)}$ denotes a probability of the i-th observation value belonging to cluster k in the k-th time of iteration;

S26. updating the covariance matrix for all k, $$\sum_k^{(t)} = \frac{\sum_{i=1}^{N}(w_i-m_k)'(w_i-m_k)T_{k,i}^{(t)}}{\sum_{i=1}^{N} T_{k,i}^{(t)}} \quad \text{formula (8)}$$

wherein ' denotes an operation of transposition, $w_i$ denotes the observation value of the i-th datum; $m_k$ denotes the mean value corresponding to the K-th cluster; and $T_{k,i}^{(t)}$ denotes a probability of the i-th observation value belonging to cluster k in the k-th time of iteration;

S27. making t=t+1 and repeating step S22 to step S27 until converging at a certain time T, and estimating parameters at the certain time T;

S28. for each i, the selected k making $T_{k,i}^{(t)}$ maximize, wherein $T_{k,i}^{(t)}$ denotes the probability of the i-th observation value belonging to cluster k in the k-th time of iteration; and S29. the likelihood function of an estimated parameter point for each i is:

$$P(d_i)\sum_{l=1}^{K} f\left(w_i \mid m_l^{(T)}, \sum_l^{(T)}\right)\alpha_{l,d_i}^{(T)}$$

wherein $P(d_i)$ denotes a probability of a time level of the i-th datum point being $d_i$; $m_l^{(T)}$ denotes a mean value of cluster 1 in the T-th time of iteration; $\Sigma_l^{(T)}$ denotes a covariance matrix of cluster 1 in the T-th time of iteration; and $\alpha_{l,d_i}^{(T)}$ denotes a probability of the time level being $d_i$ belonging to cluster 1 in the T-th time of iteration.

Further in GPLSA algorithm:

assumption 1: assume that each observation value is from a group labeled with 1-K, wherein the group is denoted as $Z=(z_i)_i$, and assume that the group of each datum point is determinate but unknown, define the set as a latent variable, refer to all points belonging to the first group as cluster 1, and rest is treated in the same manner until cluster K;

assumption 2: a joint distribution of observation values and latent variables can be decomposed as sample-based products; it is known that the group of observation value $z_i$ is k, assume that observation value $w_i$ is from a Gaussian distribution with a mean value being vector $m_k$ and a variance matrix being $\Sigma_k$;

assumption 3: GPLSA model introduces dependencies between a latent group and the time axis, it is known that the value of the time axis corresponding to each level $d_i$ is s, a probability of related latent values belonging to k is proportional to parameter $\alpha_{k,s}$, and rewrite $\alpha_{k,s}$ as an equation according to the following formula (1), where uppercase letters indicate random variables:

$$\alpha_{k,s} := P(Z_i=k|D_i=s) \quad \text{formula (1);}$$

and assumption 4: the latent variables, the observation values, and the time axes are conditionally independent, that is:

$$P(W_i=w|D_i=s,Z_i=k)=P(W_i=w|Z_i=k) \quad \text{formula (2).}$$

Further in the GPLSA algorithm, the number K of clusters needs to be determined in advance, and K can be adjusted after the clustering model is executed.

Further in step S4, a datum point in the abnormal region is called a "strong abnormal value", a datum point in the intermediate region during equal to or more than a set number of consecutive time periods is called a "long abnormal value", and a datum point in the normal region is defined as a normal point, wherein the warning threshold and the alarming threshold are adjusted according to quantity and quality of received data.

A system for detecting an abnormal value in an LTE network comprises a data loading module and an abnormal value detection module, wherein the data loading module is configured to receive a network criterion of an area to be detected by a computing device, and set times at intervals and select network resources;

the abnormal value detection module is configured to detect an abnormal value according to the above mentioned method for detecting an abnormal value in an LTE network.

The advantageous effects of the present disclosure comprise: the method and system for detecting an abnormal value in an LTE network can automatically extract information from the data stream and finally determine the occurrence time of the abnormal value. This method adds time axes in the model to better understand the temporal changes of the data points, and thus can find multiple abnormal values from a sequence of multiple points instead of a single abnormal value. In the method for detecting an abnormal value in an LTE network, the complexity of determining clustering and region presented by GPLSA is low, and each part is low can be easily understood. The implementation of the method for detecting an abnormal value in an LTE network is completely data driven and can be automated. In addition, the method or system can quickly detect abnormal values: first, even if the abnormal value comes from a new mode, the true abnormal values can be labeled; second, an abnormal value can be found immediately after it occurs; finally, the error rate of the method or system is low.

DETAILED DESCRIPTION

Preferred embodiments of the present disclosure in conjunction with the accompanying drawings will be detailed described in the following.

A system for detecting abnormal traffic in an LTE network has been disclosed. Exemplary embodiments may retrieve data including time axis information. The embodiments mainly comprises two steps to automatically run the data. First, a clustering algorithm considering time axis information is executed; and unanticipated data points are labeled according to the definition in the algorithm, to generate two types of abnormal value detection: a "long abnormal value" and a "strong abnormal value". The embodiments also verify the robustness and accuracy of the system through two examples.

Embodiments

A method for detecting an abnormal value in an LTE network, comprises the following steps of:

S1. loading measured data, wherein the measured data is generated based on a pre-selected criterion and has corresponding time, all the data are divided into a training set and a testing set, and the testing set and the training set are independent of each other but contain an identical variable;

S2. defining clusters and parameters in the training set, and finding a cluster to which each datum point belongs based on a clustering algorithm;

S3. calculating a likelihood value of each datum point based on values of parameters and results of clustering, wherein the likelihood value of a datum point is a probability density thereof in a derived model;

S4. assigning the likelihood value into an abnormal region, an intermediate region, or a normal region according to a set warning threshold and a set alarming threshold;

S5. applying a calculated model to the testing set, where the likelihood value of each datum point is calculated, and assigning these datum points into three regions so as to find an abnormal value in the testing set, wherein the three regions include the abnormal region, the intermediate region, and the normal region.

In step S1, the measured data are loaded. These data are generated based on a pre-selected criterion or pre-selected criterions. The data set contains a large amount of data, and each record has a corresponding time. The preparation work is also performed after the data is loaded: all the data are divided into a training set and a testing set. The training set is a data set that intends to discover patterns and relationships between records in the set. The testing set and the training set are independent of each other but contain an identical variable or identical variables. The testing set obeys a probability distribution similar to that of the training set. The testing set is used to evaluate the accuracy of the model derived from the training set. If a model can detect abnormal values in both the training set and the testing set, then the model is valid. In an embodiment, 70% of the data is used for the training set and 30% of the data is used for the testing set.

In step S2, clusters, i.e., bunches, are defined in the training set. The clustering algorithm is called a "latent semantic analysis model based on Gaussian probability" or GPLSA. This algorithm will be described later. In short, the data described in the parametric model is related to a time axis. The parameter values are approximate and the clusters (i.e., bunches) that need to be partitioned can be concluded.

In step S3, the likelihood value of each datum point are collectively calculated based on the values of parameters and the results of the clustering. Under the derived model, the likelihood value of a point is its probability density. The likelihood of a smaller number in the model is also smaller, so it may be a latent abnormal value.

In step S4, the likelihood values are assigned into three regions respectively. The lowest 0.1% fractile and 1% fractile are calculated for all data in the training set. The region with a likelihood value below 0.1% fractile is marked in red. These points include the most unlikely values and are latent abnormal values. The region with a likelihood value between 0.1% and 1% is marked in orange. These points correspond to unlikely likelihood values, but are not defined as abnormal values in order to reduce error rate. The data points in this region are processed based on time, and it can be seen that whether these points are still in the orange region for the continuous time axis. If a datum point is always in the region for 6 consecutive days, it is defined as an abnormal value. Finally, the region corresponding to the point, the likelihood value of which is above 1% fractile, is marked in green, and the points in it is defined as normal points. The threshold value of 0.1% fractile and 1% fractile can be adjusted according to quantity and quality of received data.

It should be emphasized two types of abnormal values: the points in the red region is called "strong abnormal values"; and the points in the orange region for four or more consecutive days is called "long abnormal values".

In step S5, the calculated model is applied to the testing set. The likelihood value for each point is calculated and these points are assigned into three regions respectively based on known fractiles. Thereby the abnormal values in the testing set are found.

The core algorithm of the embodiments is the GPLSA algorithm, which is described next. The algorithm is based on the conventional Gaussian mixture model (GMM), but creates a new association between the data values and the time axis.

In the Gaussian mixture model, the number K of clusters (bunches) needs to be determined in advance. K can be adjusted after the clustering model is executed. Half of the number of time axis levels can be used as the default K value.

Using 1 to denote a record count of data, which ranges from 1 to N. The observation values are denoted as $W=(w_i)_i$ and the time axes are denoted as $D=(d_i)_i$. Each point in set W has a corresponding point in set D. The number of levels of the time axes D is fixed and limited compared to N. For example, if an observation value is recorded every hour or if a daily cycle is generated, 24 levels can be given to D, that is, a level for an hour.

Assuming that each observation value is from a group labeled with 1-K, the group is denoted as $Z=(z_i)_i$. The group for each point is assumed to be determinate but unknown. The set is defined as a "latent variable". All points belonging to the first group are referred to as cluster (bunch) 1, and so on.

The purpose of the clustering algorithm is to find the cluster (bunch) to which a datum point belongs. Other assumptions still need to be added. The Gaussian mixture model GMM follows the following assumptions: first, a joint distribution of observation values and latent variables can be decomposed as sample-based products; second, it is known that the group of observation value $z_i$ is K, and it can be assumed that $w_i$ comes from a Gaussian distribution with a mean value being vector $m_k$ and a variance matrix being $\Sigma_k$.

In the GMM model, the probability that a record belongs to a particular latent group depends only on an unknown coefficient and is independent of the observation values and the time axis. Differently, GPLSA model introduces dependencies between the latent group and the time axis. In particular, it is known that the value of the time axis corresponding to each level $d_i$ is s, and the probability of related latent values belonging to k is proportional to parameter $\alpha_{k,s}$. Rewrite $\alpha_{k,s}$ as an equation (where uppercase letters indicate random variables) according to the following formula (1).

$$\alpha_{k,s} := P(Z_i=k|D_i=s) \qquad \text{formula (1)}$$

In order to make the formula easy to be processed and reduce the number of parameters, a last assumption is added: the latent variables, the observation values, and the time axes are conditionally independent. The formula associated with this assumption is as follows (for all i):

$$P(W_i=w|D_i=s,Z_i=k)=P(W_i=w|Z_i=k) \qquad \text{formula (2)}$$

In general, known set W and set D, the main goal is to approximate the unknown parameters $m_k$, $\Sigma_k$ and $\alpha_{k,s}$ for all k and s, wherein $m_k$ denotes a mean value corresponding to the k-th cluster, $\Sigma_k$ denotes a covariance matrix corresponding to the k-th cluster, $\alpha_{k,s}$ denotes a probability corresponding to time when level is s and cluster is k. Then likelihood estimations of these parameters and the most likely cluster for each point are obtained.

To fit the parameters of the statistical model, a maximum likelihood estimation approach is selected. In this approach, the selected parameter is the parameter with the highest likelihood value in all data sets. Due to the high dimensionality of the data, each of parameters cannot be detected and compared, thereby an approximate maximum likelihood estimation algorithm is required. Therefore, a classical iterative algorithm called Maximum Expectation (EM) is introduced. The main idea of the EM algorithm is calculated alternately by the following two steps: in the first step the expectation (E) is calculated, and the maximum likelihood estimation value is calculated using the existing estimation values of hidden variables; maximizing (M), maximizing the maximum likelihood value calculated in step E to calculate the values of the parameters. The parameter estimation values found in step M are used in calculation of the next step E. The procedure including steps E and M are performed alternately. Iteratively perform steps E and M until convergence. In the GPLSA model, the calculation is directly performed using the following formula:

$$P(W_i=w, D_i=s, Z_i=k) = P(W_i=w|Z_i=k)P(z_i|D_i=s)P(D_i=s) \quad \text{formula (3)}$$

Furthermore, for GPLSA, an accurate updating equation is obtained. Use $f(|m,\Sigma)$ to denote the Gaussian density function of the parameters m and $\Sigma$. If $d_i=s$, use $E_s$ to denote the set with index i. In order to get final parameters, the algorithm is described as follows:

S21. initializing parameters $m_k^{(t-1)}$, $\Sigma_k^{(t-1)}$ and $\alpha_{k,s}$ for all k and s, wherein t denotes times of iterations, when t=1, $m_k^{(t-1)}$ denotes an initial value of the mean value of the k-th cluster, $\Sigma_k^{(t-1)}$ denotes an initial covariance matrix of the k-th cluster, and $\alpha_{k,s}$ denotes a probability corresponding to time when level is s and cluster is k;

S22. calculating, for all k and i and when $W_i=w_i$ and $D_i=d_i$, a probability and the parameter $T_{k,i}^{(t)}$ corresponding to the group of the observation value $Z_i$ being k, i.e., $Z_i=k$, wherein $w_i$ and $d_i$ denotes an observation value and a time value at the i-th datum point respectively, $$T_{k,i}^{(t)} := f\left(w_i \mid m_k^{(t-1)}, \sum_k^{(t-1)}\right)\alpha_{k,d_i}^{(t-1)} \bigg/ \sum_{l=1}^K f\left(w_i \mid m_l^{(t-1)}, \sum_1^{(t-1)}\right)\alpha_{l,d_i}^{(t-1)} \quad \text{formula (4)}$$

wherein i is a record count of data, t denotes the t-th time of iterations, $T_{k,i}^{(t)}$ denotes a probability of the i-th observation value belonging to the k-th cluster in the t-th time of iteration; f denotes a probability of the observation value is $w_i$ in the k-th cluster when the mean value is $m_k^{(t-1)}$, the covariance matrix is $\Sigma_k^{(t-1)}$ and the (t−1)-th time of iteration is performed; $\alpha_{k,d_i}^{(t-1)}$ denotes a probability of performing the (t−1)-th time of iteration for the k-th cluster when the time value is $d_i$; $m_k^{(t-1)}$ denotes the initial value of the mean value for the k-th cluster and the (t−1)-th time of iteration; and $\Sigma_k^{(t-1)}$ denotes an initial value of the variance for the k-th cluster and the (t−1)-th time of iteration;

S23. calculating $S_{k,s}^{(t)}$ for all k and s, $$S_{k,s}^{(t)} = \sum_{j=1}^{\#E_s} T_{k,E_s(j)}^{(t)} \quad \text{formula (5)}$$

wherein $\#E_s$ denotes a length of set $E_s$, $S_{k,s}^{(t)}$ denotes a mathematical expectation of probability value $T_{k,i}^{(t)}$; $T_{k,E_s(j)}^{(t)}$ denotes a probability of all observation values $E_s(j)$ with index j belonging to cluster k in the j-th time of iteration; and $E_s(j)$ denotes a set of observation values with index j;

S24. updating probability $\alpha_{k,s}$ for all k and s, $$\alpha_{k,s}^{(t)} = \frac{S_{k,s}^{(t)}}{\sum_{j=1}^K S_{l,s}^{(t)}} \quad \text{formula (6)}$$

wherein $S_{k,s}^{(t)}$ denotes a mathematical expectation of probability value $T_{k,i}^{(t)}$; and $S_{l,s}^{(t)}$ denotes a mathematical expectation when probability value $T_{k,i}^{(t)}$ belonging to cluster 1;

S25. updating the mean value $m_k^{(t)}$ for all k, $$m_k^{(t)} = \frac{\sum_{i=1}^N w_i T_{k,i}^{(t)}}{\sum_{i=1}^N T_{k,i}^{(t)}} \quad \text{formula (7)}$$

wherein $w_i$ denotes the observation value of the i-th datum; and $T_{k,i}^{(t)}$ denotes a probability of the i-th observation value belonging to cluster k in the k-th time of iteration;

S26. updating the covariance matrix for all k, $$\Sigma_k^{(t)} = \frac{\sum_{i=1}^N (w_i - m_k)'(w_i - m_k)T_{k,i}^{(t)}}{\sum_{i=1}^N T_{k,i}^{(t)}} \quad \text{formula (8)}$$

wherein ' denotes an operation of transposition, $w_i$ denotes the observation value of the i-th datum; $m_k$ denotes the mean value corresponding to the K-th cluster; and $T_{k,i}^{(t)}$ denotes a probability of the i-th observation value belonging to cluster k in the k-th time of iteration;

S27. making t=t+1 and repeating step S22 to step S27 until converging at a certain time T, and estimating parameters at the certain time T;

S28. for each i, the selected k making $T_{k,i}^{(t)}$ maximize, wherein $T_{k,i}^{(t)}$ denotes the probability of the i-th observation value belonging to cluster k in the k-th time of iteration; and S29. the likelihood function of an estimated parameter point for each i is:

$$P(d_i)\sum_{i=1}^K f(w_i \mid m_l^{(T)}, \Sigma_l^{(T)})\alpha_{l,d_i}^{(T)}$$

wherein $P(d_i)$ denotes a probability of a time level of the i-th datum point being $d_i$; $m_l^{(T)}$ denotes a mean value of cluster 1 in the T-th time of iteration; $\Sigma_l^{(T)}$ denotes a covariance matrix of cluster 1 in the T-th time of iteration; and $\alpha_{l,d_i}^{(T)}$ denotes a probability of the time level being $d_i$ belonging to cluster 1 in the T-th time of iteration.

The embodiments describe a data detection process based on time axes. These time axes contain important information about data performance, such as a daily cycle or a weekly cycle. Here, a highly reliable abnormal value detection method is introduced. This method is an algorithm in which the time axis is an important factor. The algorithm can detect abnormal values in a new mode and accurately find unanticipated abnormal values. Moreover, the process of abnormal value detection is rapid. Therefore, the mobile operator can confirm and detect the abnormal values in time according to the method, thereby reducing the cost that may be incurred.

The clustering method defined by the embodiments makes full use of the information related to time axes. These time information is usually collected when collecting data, but it is rarely used in conventional clustering algorithms. Introducing the time axis into the model make the variation of data points versus time being better understood, a plurality of abnormal values may be discovered from a sequence consisting of a plurality of points rather than a single abnormal value.

A system for detecting an abnormal value in an LTE network comprises a data loading module and an abnormal value detection module, wherein the data loading module is configured to receive a network criterion of an area to be detected by a computing device, and set times at intervals and select network resources;

the abnormal value detection module is configured to detect an abnormal value according to the above mentioned method for detecting an abnormal value in an LTE network.

The kind of system for detecting an abnormal value in an LTE network may receive data and then identify abnormal traffic element. The received data includes network resource criterions, corresponding values, and time axis information. The system according to embodiments uses statistical tools to calculate the probability that a data point is a normal value; an algorithm is used to alert the single point or those continuous points that have unanticipated performance.

The system according to embodiments groups data having similarity by using statistical tools and using the data values and the time axis information simultaneously; when data points are regarded to be unanticipated, restrictive thresholds are selected; an abnormal value or abnormal values are detected from these restrictive thresholds. For two different types of abnormal values, that is "long abnormal values" and "strong abnormal values", an "alarming threshold" and a "warning threshold" are defined respectively; and these thresholds are calculated by likelihood estimations.

Simulation Test

Figure 1:
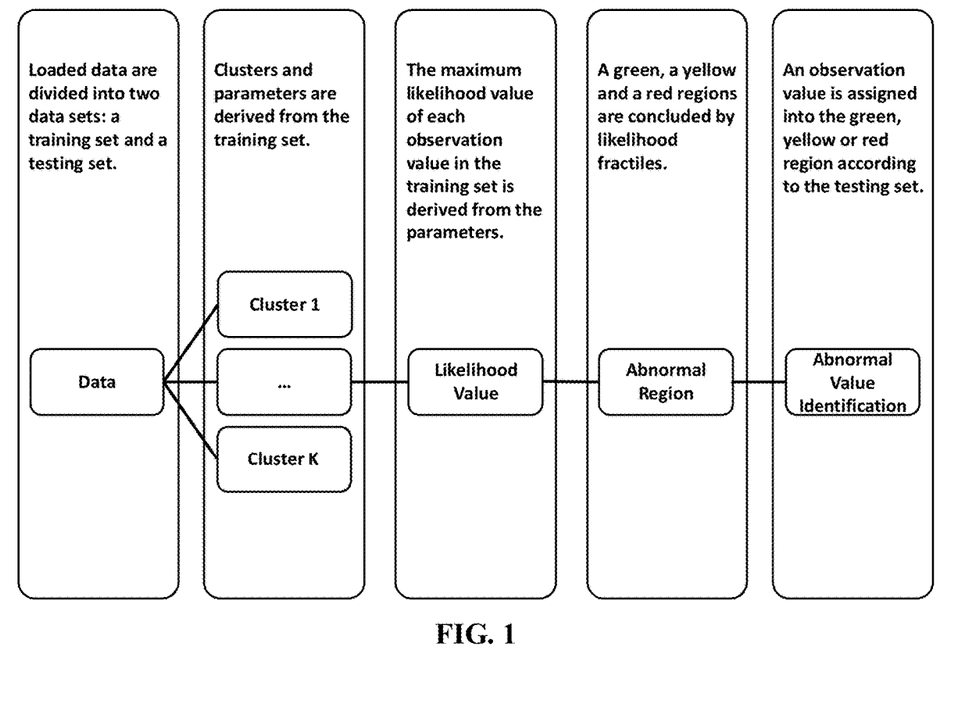
FIG. 1 is a schematic flow diagram of a method for detecting an abnormal value in an LTE network of the present disclosure.
Figure 2:
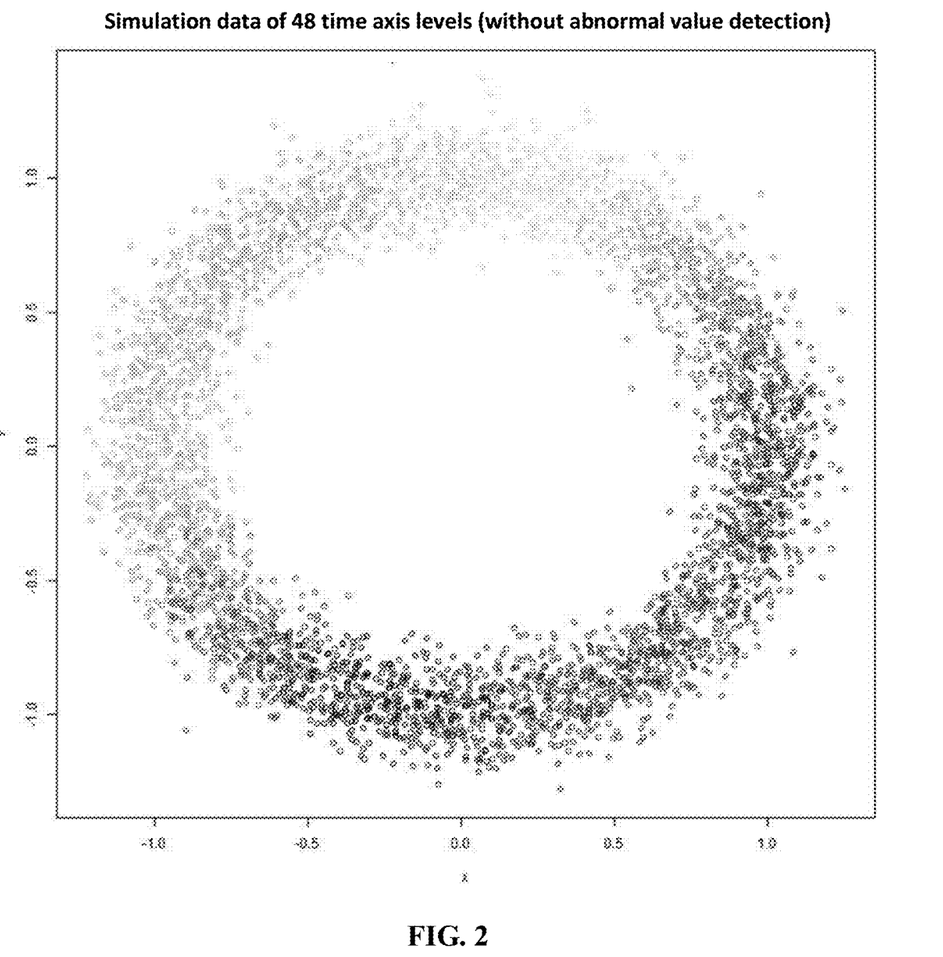
FIG. 2 is a schematic diagram of a typical two-dimensional data set for testing without any abnormal value according to an exemplary embodiment, where the horizontal axis x and vertical axis y represent a characteristic value corresponding to a two-dimensional datum point in different dimensions respectively.
Figure 3:
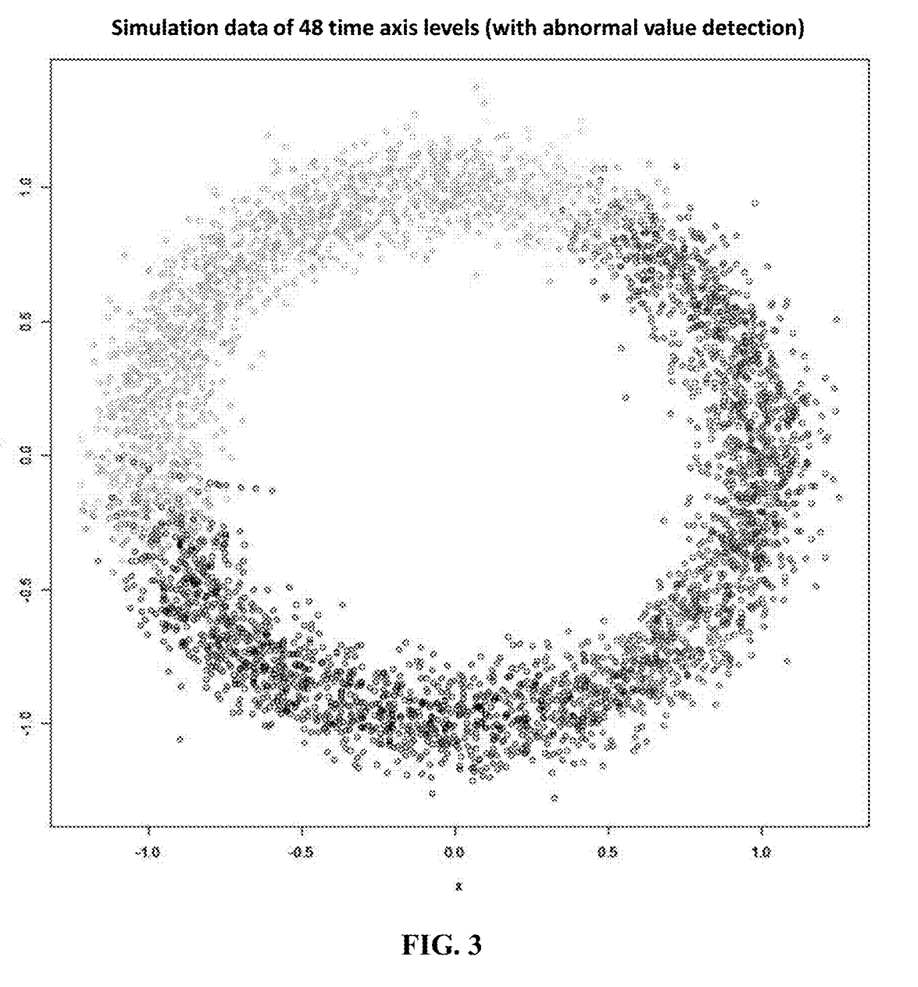
FIG. 3 is a schematic diagram of a typical two-dimensional data set for testing with an abnormal value according to an exemplary embodiment, where the horizontal axis x and vertical axis y represent a characteristic value corresponding to a two-dimensional datum point in different dimensions respectively.

The grouping process and the abnormal value detection process have been performed simulation tests respectively on both data sets. For two data sets, observation values are all two-dimensional real data, and the time is divided into 48 levels. Here, every 30 minutes can be considered as a level in a daily cycle. The evolution of the time points rotates counterclockwise. As shown in FIG. 2, the simulation of the first data set, i.e., data set 1, does not contain any abnormal value. Here, a color represents a level. As shown in FIG. 3, a key abnormal value is added to data set 2, which is located between (−1, 0) roughly. Over time, the abnormal value is in the accurate position and level from the first time, and then does not move counterclockwise with being still close to the position of (−1, 0).

Figure 4:
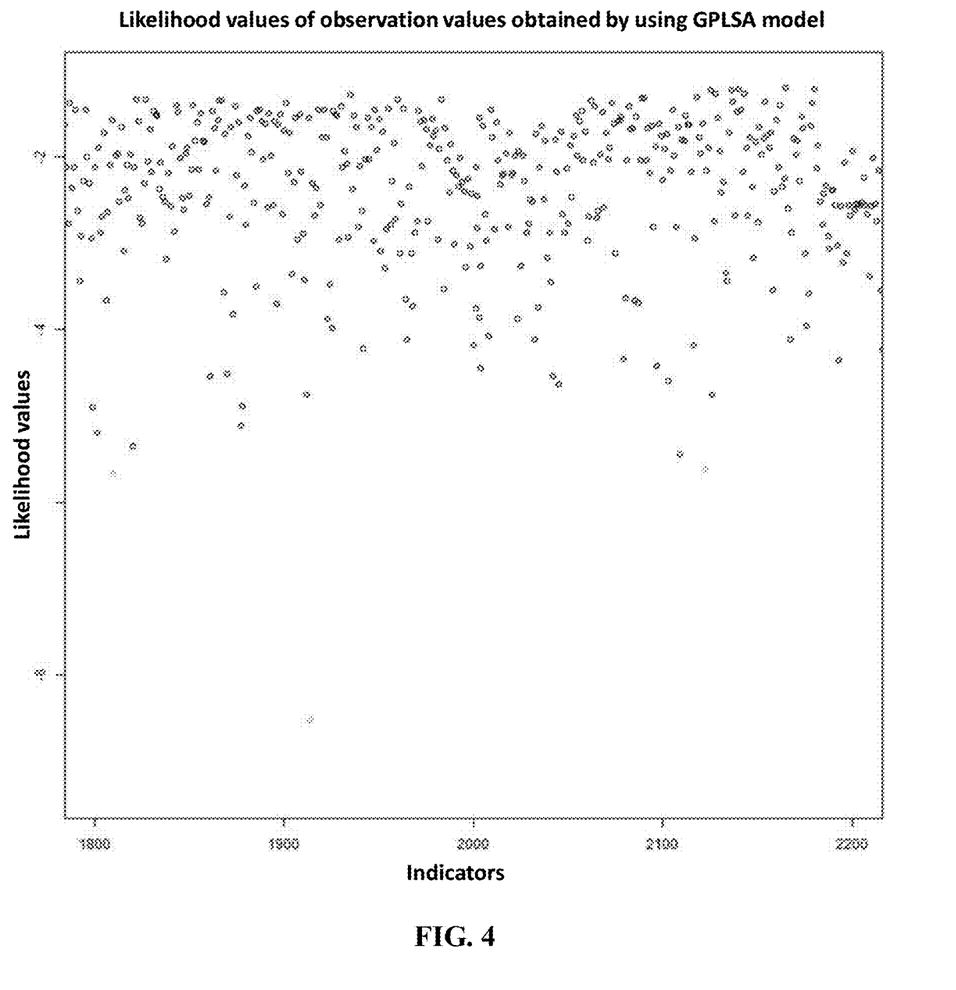
FIG. 4 is a schematic diagram of a typical abnormal value detection by log-likelihood estimation according to an exemplary embodiment, wherein the used data have no abnormal value, wherein the horizontal axis x and vertical axis y represent a characteristic value corresponding to a two-dimensional datum point in different dimensions respectively.
Figure 5:
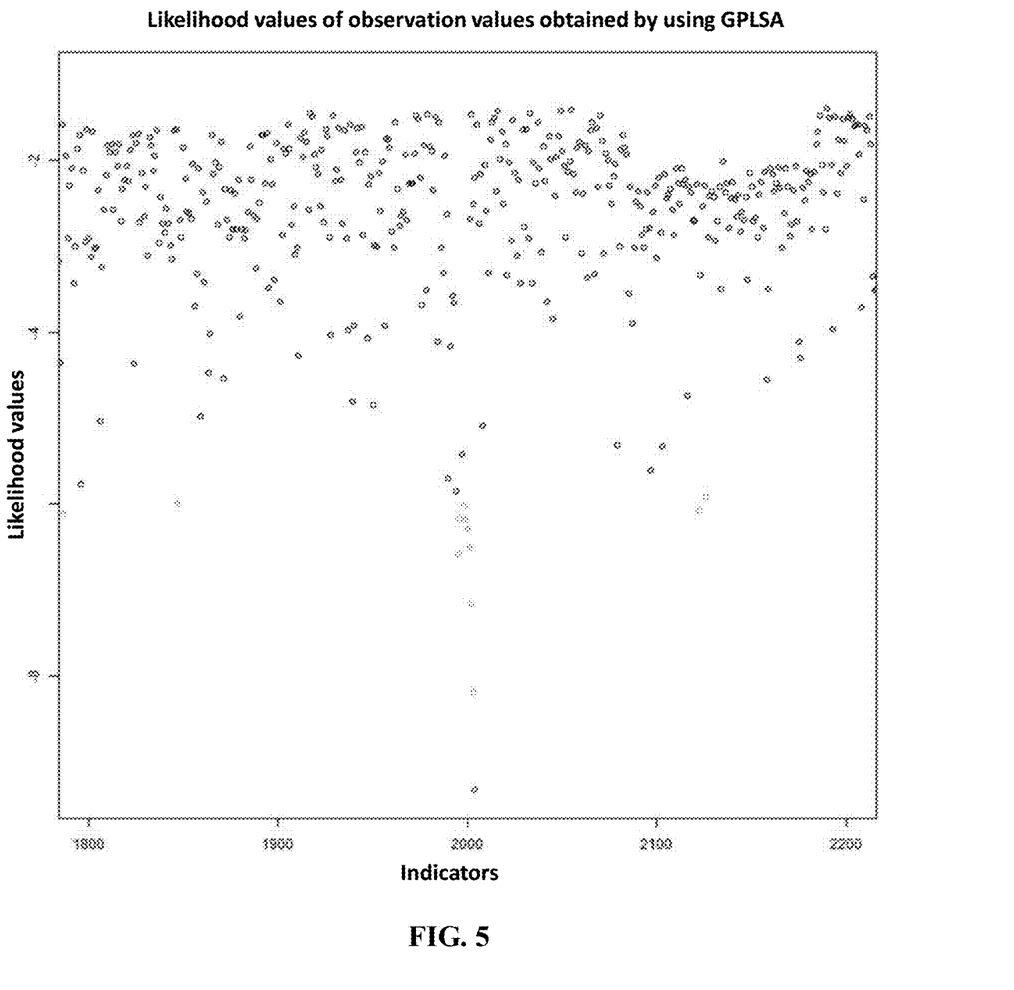
FIG. 5 is a schematic diagram of a typical abnormal value detection by log-likelihood estimation according to an exemplary embodiment, during which the used data have an abnormal value, wherein the horizontal axis x and vertical axis y represent a characteristic value corresponding to a two-dimensional datum point in different dimensions respectively.
Figure 6:
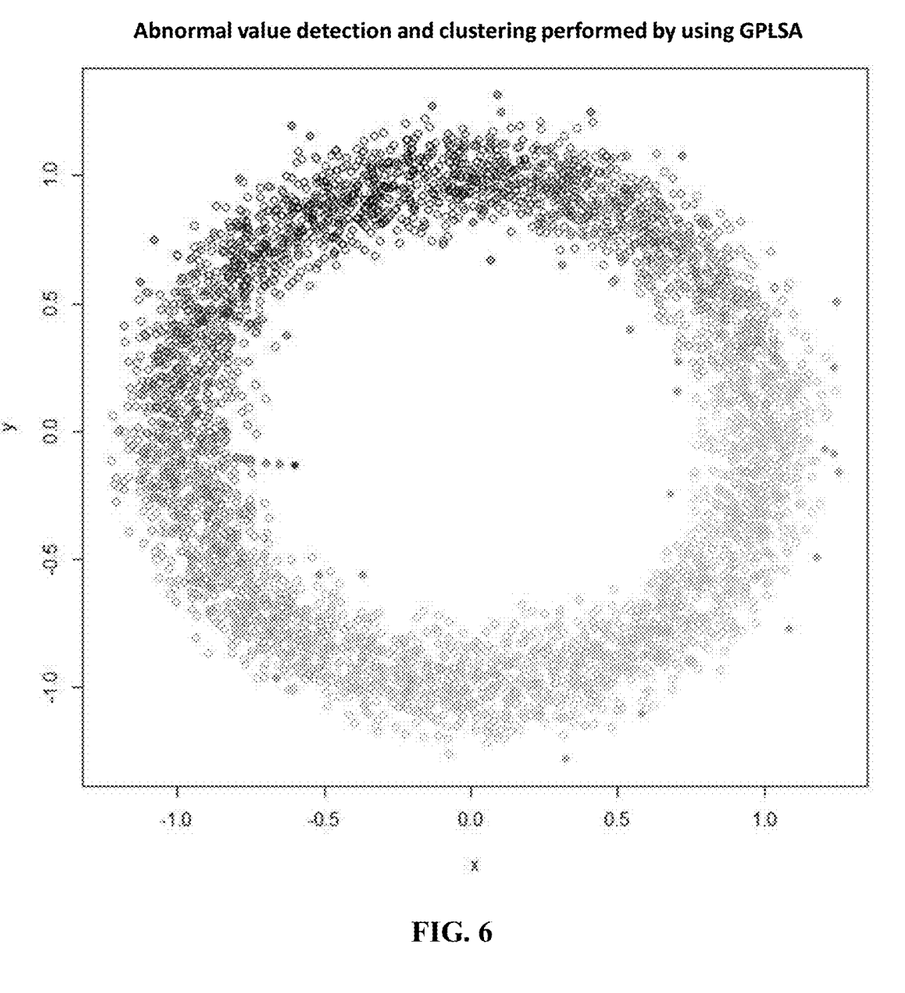
FIG. 6 is a schematic diagram of a clustering result of a typical two-dimensional data set with an added abnormal value according to an exemplary embodiment, wherein the horizontal axis x and vertical axis y represent a characteristic value corresponding to a two-dimensional datum point in different dimensions respectively.

The results of FIGS. 4, 5 and 6 is obtained by training through a program with GPLSA and 24 clusters (i.e., bunches).

Results of likelihood of the training data in set 1 are shown in FIG. 4. In particular, only data points located between 1800-2200 are presented. Most of the points are in the green region, which are presented in black in FIG. 4, while few points are in the orange region, which are shown in orange in FIG. 4. In addition, these points are isolated but not labeled as abnormal values. Overall, the results are predictable and the error rate is low.

FIG. 5 shows the results of data set 2 after training. When the likelihood value is gradually lowered, it can be considered that an abnormal value is detected. First, a "long abnormal value" warning is generated when a point are in the orange region for a period of four consecutive levels; and a "strong abnormal value" warning is generated by the last abnormal value in the red region. Therefore, the process can detect abnormal values and give warnings.

Figure 7:
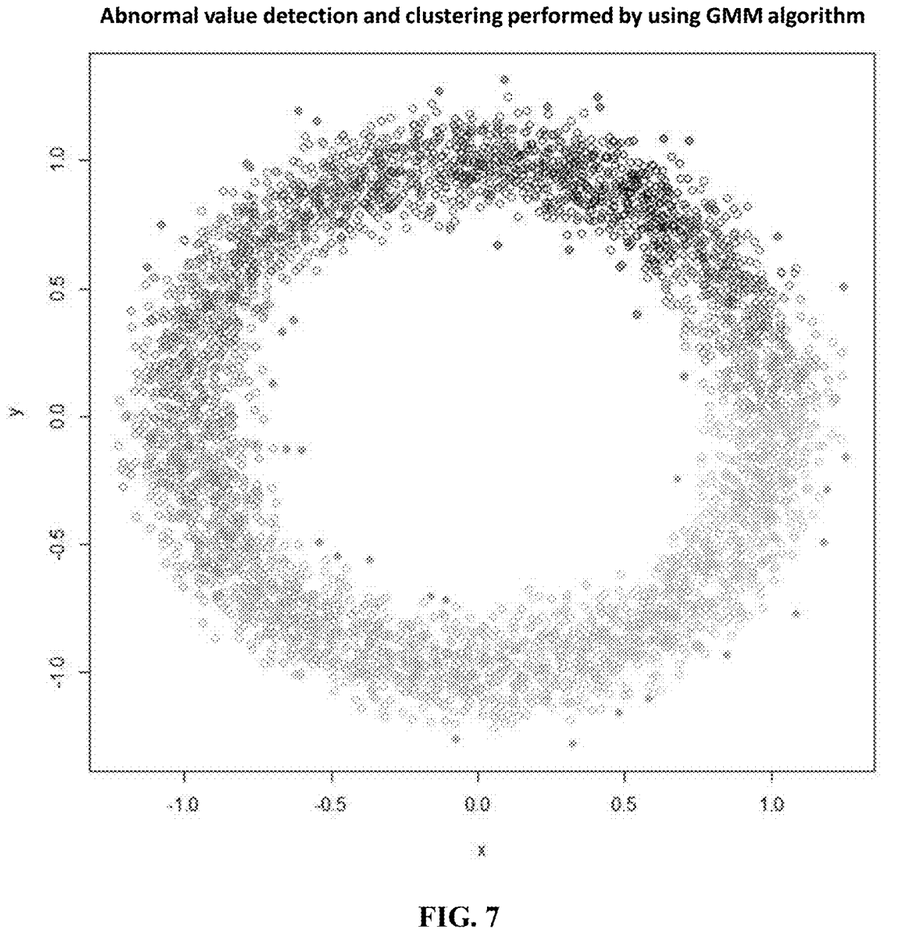
FIG. 7 is a schematic diagram of a clustering result of a typical two-dimensional data set with an added abnormal value according to a conventional method, wherein the horizontal axis x and vertical axis y represent a characteristic value corresponding to a two-dimensional datum point in different dimensions respectively.

FIG. 6 shows the results of the two-dimensional data in set 2. Here, a color represents a cluster or bunch. Orange dots represent the orange region and red dots represent the red region. As shown in FIG. 5, even if the abnormal value is in the range of (−1, 0), the abnormal value can also be detected in advance. For comparison, as shown in FIG. 7, the process uses a GMM algorithm with 24 clusters (i.e., bunches). The algorithm cannot detect abnormal values and cannot detect them in advance.

In general, the complexity of determining clustering and region presented by GPLSA is low, and each part of the program can be easily understood. The implementation of the program is completely data driven and can be automated. In addition, it can quickly detect abnormal values: first, even if the abnormal value comes from a new mode, the true abnormal values can be labeled; second, an abnormal value can be found immediately after it occurs; finally, the error rate is low.

What is claimed is:

1. A method for detecting an abnormal value in an LTE network, comprising:
   receiving, by a receiving device, measured data in an LTE network based on a pre-selected criterion; and
   transmitting, by the receiving device, the measured data and corresponding time thereof to a computing device, the method further comprising the following performed by the computing device:
   S1. loading the measured data, all the data are divided into a training set and a testing set, and the testing set and the training set are independent of each other but contain an identical variable;
   S2. defining clusters and parameters in the training set, and finding a cluster to which each datum point belongs based on a clustering algorithm;
   S3. calculating a likelihood value of each datum point based on values of parameters and results of clustering, wherein the likelihood value of a datum point is a probability density thereof in a derived model;
   S4. assigning the likelihood value into an abnormal region, an intermediate region, or a normal region according to a set warning threshold and a set alarming threshold;
   S5. applying a calculated model to the testing set, where the likelihood value of each datum point is calculated, and assigning these datum points into three regions so as to find an abnormal value in the testing set, wherein the three regions include the abnormal region, the intermediate region, and the normal region, wherein in step S2, the clustering algorithm uses a latent semantic analysis model based on Gaussian probability, that is, a GPLSA algorithm, and known a set of observation values W and a set of time axes D, each datum point in the set of observation values W has a corresponding datum point in the set of time axes D; the GPLSA algorithm approximates unknown parameters $m_k$, $\Sigma_k$ and $\alpha_{k,s}$ and for each cluster k and value s corresponding to each time level, wherein $m_k$ denotes a mean value corresponding to the k-th cluster, $\Sigma_k$ denotes a covariance matrix corresponding to the k-th cluster, $\alpha_{k,s}$ denotes a probability corresponding to time when level is s and cluster is k; and then likelihood estimations of unknown parameters $m_k$, $\Sigma_k$ and $\alpha_{k,s}$ and the most likely cluster for each datum point are obtained.

2. The method for detecting an abnormal value in an LTE network according to claim 1, wherein the GPLSA algorithm specifically comprises steps of:
   S21. initializing parameters $m_k^{(t-1)}$, $\Sigma_k^{(t-1)}$ and $\alpha_{k,s}$ and for all k and s, wherein t denotes times of iterations, when t=1, $m_k^{(t-1)}$ denotes an initial value of the mean value of the k-th cluster, $\Sigma_k^{(t-1)}$ denotes an initial covariance matrix of the k-th cluster, and $\alpha_{k,s}$ denotes a probability corresponding to time when level is s and cluster is k;

S22. calculating, for all k and i and when $W_i=w_i$ and $D_i=d_i$, a probability and the parameter $T_{k,i}^{(t)}$ corresponding to the group of the observation value $Z_i$ being k, i.e., $Z_i=k$, wherein $w_i$ and $d_i$ denotes an observation value and a time value at the i-th datum point respectively, $$T_{k,i}^{(t)} := f(w_i \mid m_k^{(t-1)}, \Sigma_k^{(t-1)})\alpha_{k,d_i}^{(t-1)} / \sum_{i=1}^{K} f(w_i \mid m_l^{(t-1)}, \Sigma_l^{(t-1)})\alpha_{l,d_i}^{(t-1)} \quad \text{formula (4)}$$

wherein i is a record count of data, t denotes the t-th time of iterations, $T_{k,i}^{(t)}$ denotes a probability of the i-th observation value belonging to the k-th cluster in the t-th time of iteration; f denotes a probability of the observation value is $w_i$ in the k-th cluster when the mean value is $m_k^{(t-1)}$ the covariance matrix is $\Sigma_k^{(t-1)}$ and the (t-1)-th time of iteration is performed; denotes a probability of performing the (t-1)-th time of iteration for the k-th cluster when the time value is $d_i$; $m_k^{(t-1)}$ denotes the initial value of the mean value for the k-th cluster and the (t-1)-th time of iteration; and $\Sigma_k^{(t-1)}$ denotes an initial value of the variance for the k-th cluster and the (t-1)-th time of iteration;

S23. calculating $S_{k,s}^{(t)}$ for all k and s, $$S_{k,i}^{(t)} = \sum_{j=1}^{\#E_s} T_{k,E_s(j)}^{(t)} \quad \text{formula (5)}$$

wherein $\#E_s$ denotes a length of set $E_s$, $S_{k,s}^{(t)}$ denotes a mathematical expectation of probability value $T_{k,i}^{(t)}$; denotes a probability of all observation values $E_s^{(j)}$ with index j belonging to cluster k in the t-th time of iteration; and $E_s^{(j)}$ denotes a set of observation values with index j;

S24. updating probability for all k and s, $$\alpha_{k,s}^{(t)} = \frac{S_{k,s}^{(t)}}{\sum_{i=1}^{K} S_{l,s}^{(t)}} \quad \text{formula (6)}$$

wherein $S_{k,s}^{(t)}$ denotes a mathematical expectation of probability value $T_{k,i}^{(t)}$; and $S_{l,s}^{(t)}$ denotes a mathematical expectation when probability value belonging to cluster 1;

S25. updating the mean value for all k, $$m_k^{(t)} = \frac{\sum_{i=1}^{N} w_i T_{k,i}^{(t)}}{\sum_{i=1}^{N} T_{k,i}^{(t)}} \quad \text{formula (7)}$$

wherein denotes the observation value of the i-th datum; and denotes a probability of the i-th observation value belonging to cluster k in the k-th time of iteration;

S26. updating the covariance matrix for all k, $$\Sigma_k^{(t)} = \frac{\sum_{i=1}^{N} (w_i - m_k)'(w_i - m_k) T_{k,i}^{(t)}}{\sum_{i=1}^{T} T_{k,i}^{(t)}} \quad \text{formula (8)}$$

wherein ' denotes an operation of transposition, $w_i$ denotes the observation value of the i-th datum; $m_k$ denotes the mean value corresponding to the K-th cluster; and $T_{k,i}^{(t)}$ denotes a probability of the i-th observation value belonging to cluster k in the t-th time of iteration;

S27. making t=t+1 and repeating step S22 to step S27 until converging at a certain time T, and estimating parameters at the certain time T;

S28. for each i, the selected k making $T_{k,i}^{(T)}$ maximize, wherein $T_{k,i}^{(t)}$ denotes the probability of the i-th observation value belonging to cluster k in the t-th time of iteration; and S29. the likelihood function of an estimated parameter point for each i is:

$$P(d_i) \sum_{i=1}^{K} f(w_i \mid m_l^{(T)}, \Sigma_l^{(T)}) \alpha_{l,d_i}^{(T)}$$

wherein $P(d_i)$ denotes a probability of a time level of the i-th datum point being $d_i$; $m_i^{(T)}$ denotes a mean value of cluster 1 in the T-th time of iteration; $\Sigma_i^{(T)}$ denotes a covariance matrix of cluster 1 in the T-th time of iteration; and $\alpha_{l,d_i}^{(T)}$ denotes a probability of the time level being belonging to cluster 1 in the T-th time of iteration.

3. The method for detecting an abnormal value in an LTE network according to claim 1, wherein in GPLSA algorithm:

assumption 1: assume that each observation value is from a group labeled with 1-K, wherein the group is denoted as $Z=(z_i)_i$, and assume that the group of each datum point is determinate but unknown, define the set as a latent variable, refer to all points belonging to the first group as cluster 1, and rest is treated in the same manner until cluster K;

assumption 2: a joint distribution of observation values and latent variables can be decomposed as sample-based products; it is known that the group of observation value $z_i$ is k, assume that observation value $w_i$ is from a Gaussian distribution with a mean value being vector $m_k$ and a variance matrix being $\Sigma_k$;

assumption 3: GPLSA model introduces dependencies between a latent group and the time axis, it is known that the value of the time axis corresponding to each level $d_i$ is s, a probability of related latent values belonging to k is proportional to parameter $\alpha_{k,s}$, and rewrite $\alpha_{k,s}$ as an equation according to the following formula (1), where uppercase letters indicate random variables:

$$\alpha_{k,s} := P(Z_i=k \mid D_i=s) \quad \text{formula (1); and}$$

assumption 4: the latent variables, the observation values, and the time axes are conditionally independent, that is:

$$P(W_i=w \mid D_i=s, Z_i=k) = P(W_i=w \mid Z_i=k) \quad \text{formula (2).}$$

4. The method for detecting an abnormal value in an LTE network according to claim 3, wherein in the GPLSA algorithm, the number K of clusters needs to be determined in advance, and K can be adjusted after the clustering model is executed.

5. The method for detecting an abnormal value in an LTE network according to claim 1, wherein in step S4, a datum point in the abnormal region is called a "strong abnormal value", a datum point in the intermediate region during equal to or more than a set number of consecutive time periods is called a "long abnormal value", and a datum point in the normal region is defined as a normal point, wherein the warning threshold and the alarming threshold are adjusted according to quantity and quality of received data.

6. A method for detecting an abnormal value in an LTE network, comprising:
receiving, by a receiving device, measured data in an LTE network, the measured data including a plurality of datum points $w_i$; and
transmitting, by the receiving device, the measured data to a computing device,
the method further comprising the following performed by the computing device:
obtaining a likelihood value of a datum point $w_i$ to be determined in the LTE network based on a pre-trained model;
comparing the likelihood value with a pre-set first threshold value and a pre-set second threshold value, wherein the first threshold value is lower than the second threshold value,
determining the datum point $w_i$ as an abnormal value in the case of the likelihood value being lower than the first threshold value;
determining the datum pointe $w_i$ as a non-abnormal value in the case of the likelihood value being higher than the second threshold value; and
in the case of the likelihood value being higher than the first threshold value and lower than the second threshold value, determining whether the likelihood value of the datum point $w_i$ is higher than the first threshold value and lower than the second threshold value during a pre-set number of continuous time levels, and further determining the datum point $w_i$ as an abnormal value if yes, wherein the pre-trained model is obtained by training based on the following processes using each datum point in a $w_i$ training set:
calculating a probability $T_{k,i}^{(T)}$ that the i-th datum point belongs to the cluster k at the t-th time of iterations according to GPLSA algorithm, and calculating, based on the probability $T_{k,i}^{(T)}$, a mean $m_k^{(t)}$ value of the cluster k at the t-th time of iterations, a covariance matrix $\Sigma_k^{(t)}$ of the cluster k at the t-th time of iterations, and a probability $\alpha_{k,s}^{(t)}$ of the cluster being k and the time level being s at the t-th time of iterations until the T-th time of iterations at which the mean value $m_k^{(t)}$, the covariance matrix $\Sigma_k^{(t)}$ and the probability $\alpha_{k,s}^{(t)}$ converge; and
obtaining a likelihood value of the datum point $w_i$ according to the following formula:

$$P(d_i)\sum_{i=1}^{K} f(w_i \mid m_l^{(T)}, \Sigma_l^{(T)})\alpha_{l,d_i}^{(T)}$$

wherein $P(d_i)$ denotes a probability of the time level of the datum point $w_i$ being $d_i$; $m_l^{(T)}$ denotes the mean value of cluster 1 at the T-th time of iterations; $\Sigma_l^{(T)}$ denotes a covariance matrix of cluster 1 at the T-th time of iterations; $f(w_i|m_l^{(T)},\Sigma_l^{(T)})$ denotes a probability of the value of a datum point being $w_i$ in the case of the mean value being $m_l^{(T)}$ and the covariance matrix being $\Sigma_l^{(T)}$; $\alpha_{l,d_i}^{(T)}$ denotes a probability that the cluster is 1 and the time level is at the T-th time of iterations,
wherein i is a record count of datum points and i=1, N, where N is a total number of datum points in the training set, t is a record count of the number of iterations and t=1, T, k is a record count of and k=1, K, where K is a total number of clusters.

7. The method for detecting an abnormal value in an LTE network according to claim 6, wherein calculating the mean value $m_k^{(t)}$ based on the probability $T_{k,i}^{(t)}$ comprises calculating the mean value $m_k^{(t)}$ according to the following formula:

$$m_k^{(t)} = \frac{\sum_{i=1}^{N} w_i T_{k,i}^{(t)}}{\sum_{i=1}^{N} T_{k,i}^{(t)}};$$

calculating the covariance matrix $\Sigma_k^{(t)}$ based on the probability $T_{k,i}^{(t)}$ comprises calculating the covariance matrix $\Sigma_k^{(t)}$ according to the following formula:

$$\Sigma_k^{(t)} = \frac{\sum_{i=1}^{N} (w_i - m_k)' (w_i - m_k) T_{k,i}^{(t)}}{\sum_{i=1}^{T} T_{k,i}^{(t)}}; \text{ and}$$

calculating the probability $\alpha_{k,s}^{(t)}$ based on the probability $T_{k,i}^{(t)}$ comprises calculating the probability $\alpha_{k,s}^{(t)}$ according to the following formula:

$$\alpha_{k,s}^{(t)} = \frac{S_{k,s}^{(t)}}{\sum_{i=1}^{K} S_{l,s}^{(t)}},$$

which $S_{k,s}^{(t)}$ denotes a mathematical expectation of the probability $T_{k,i}^{(t)}$.

8. A system for detecting an abnormal value in an LTE network, comprising:
one or more processors;
one or more memories configured to store a series of computer executable instructions, wherein the series of computer executable instructions, when executed by the one or more processors, cause the one or more processors to perform the method for detecting an abnormal value in an LTE network of any one of claims 2, 5-6 and 7.

* * * * *